US011318004B2

(12) United States Patent
Roshkovan

(10) Patent No.: US 11,318,004 B2
(45) Date of Patent: May 3, 2022

(54) DENTAL DEVICE DESIGNED TO MEASURE DENTAL ARCH PARAMETERS, AND DEVELOP AN ALGORITHM AND METHOD FOR DETERMINING IDEAL POSITIONS OF DENTAL IMPLANTS IN EDENTULOUS PATIENTS

(71) Applicant: Igor Roshkovan, Los Angeles, CA (US)

(72) Inventor: Igor Roshkovan, Los Angeles, CA (US)

(73) Assignee: Igor Roshkovan, Los Angeles, CA (US)

( * ) Notice: Subject to any disclaimer, the term of this patent is extended or adjusted under 35 U.S.C. 154(b) by 0 days.

(21) Appl. No.: 16/974,015

(22) Filed: Sep. 5, 2020

(65) Prior Publication Data
US 2022/0071749 A1    Mar. 10, 2022

(51) Int. Cl.
*A61C 19/02*    (2006.01)
*A61C 19/04*    (2006.01)
*A61C 9/00*    (2006.01)

(52) U.S. Cl.
CPC ............ *A61C 19/04* (2013.01); *A61C 9/0053* (2013.01)

(58) Field of Classification Search
CPC ..... A61C 19/04; A61C 9/0053; A61C 19/045; A61C 19/05
USPC ..................................... 433/68, 69, 73, 214
See application file for complete search history.

(56) References Cited

U.S. PATENT DOCUMENTS

| | | | | |
|---|---|---|---|---|
| 1,385,070 A | * | 7/1921 | Davidson | A61C 19/045 433/41 |
| 1,976,045 A | * | 10/1934 | Sorenson | A61C 19/00 33/513 |
| 2,794,253 A | * | 6/1957 | Fitzsimmons | A61C 19/045 433/69 |
| 3,074,166 A | * | 1/1963 | Skallerup | A61C 11/022 433/69 |
| 3,130,494 A | * | 4/1964 | Mackay | A61C 19/045 433/69 |
| 4,014,097 A | * | 3/1977 | Pameijer | A61C 19/045 433/27 |
| 5,154,609 A | * | 10/1992 | George | A61C 9/0006 433/214 |
| 5,810,586 A | * | 9/1998 | Fjelstad | A61C 19/05 33/513 |
| 2008/0187882 A1 | * | 8/2008 | Margossian | A61C 19/045 433/68 |
| 2013/0216972 A1 | * | 8/2013 | Kolozsvary | A61C 5/77 433/29 |

\* cited by examiner

*Primary Examiner* — Nicholas D Lucchesi

(57) ABSTRACT

The present inventions relate to dental medicine, specifically to restorative, prosthetic and implant dentistry. The proposed innovations are a system comprised of a dental measuring device, method and developed algorithm for measuring the alveolar process of jaws and structurally optimizing measurements to determine the ideal position for dental implants. The system identifies precise implant locations in consideration of jaw size, chosen number of dental implants, and the applied forces and movements in all directions (Six degree of freedom) generated by mastication in fully or partially edentulous patients.

20 Claims, 12 Drawing Sheets

```
Choose number of implants (2,4 or 6): 6

Coordinates of the implants 1&2

26.68000    20.11218    0.00000
    26.68000   -20.11218    0.00000

Coordinates of the implants 3&4

17.40000    17.63745    0.00000
    17.40000   -17.63745    0.00000

Coordinates of the implants 5&6

```
% FORCES:
    f=zeros(max(max(Dof)),1);
    f((Npts*6)-3)=-1;
    f(max(max(Dof))-3)=-1;
    f(3)=-1;

% Distributed load:
    for i=1:Npts
        f(3+6*(i-1))=(-100-(400/H)*Coord(i))*0.01;
    end
    for i=1:N
     f(6*Npts+3+6*(i-1))=f(3+6*i);
    end % Shear Force (x-direction)
    for i=1:Npts
        f(1+6*(i-1))=-3;
    end
    for i=1:N
     f(6*Npts+1+6*(i-1))=f(1+6*i);
    end % Shear Force (y-direction)
    for i=1:Npts
        f(2+6*(i-1))=2;
    end
    for i=1:N
     f(6*Npts+2+6*(i-1))=-f(2+6*i);
    end
```

FIG. 10

… # DENTAL DEVICE DESIGNED TO MEASURE DENTAL ARCH PARAMETERS, AND DEVELOP AN ALGORITHM AND METHOD FOR DETERMINING IDEAL POSITIONS OF DENTAL IMPLANTS IN EDENTULOUS PATIENTS

BACKGROUND

The present inventions related to implant dentistry. It consists of a dental measurement device that develops an algorithm and method for measuring the jaw's alveolar process structure and resulting bite forces to determine the optimal position for implants in edentulous patients.

This device will enhance dental surgery and procedures involving fixed implant retained bridges, implant supported or retained removable overdentures, screw retained overdentures, and set up for dental intraoral prostheses in the mouth of edentulous patients.

Modern implant dentistry usually involves restoring teeth in an edentulous patient by using dental implants to reconstruct intraoral defects and to replace physiologic function with the implant-supported or implant-retained dental prosthesis.

Dental prosthesis means a set of artificial teeth that is designed to esthetically and functionally replace missing original teeth in edentulous patients.

An implant-supported or implant-retained overdenture is defined as a dental prosthesis that obtains its entire support from dental implants and intraoral soft tissue.

The oral surgeon must combine clinical findings with professional knowledge and skills to determine the ideal position of a dental implant and the design of a prosthesis in the jaw.

Even the most experienced practitioners sometimes face complications in implant dentistry having to do with implant components and dental prostheses. To minimize or avoid those complications, oral surgeons must consider several factors for clinical determination such as masticatory forces, naturally reaching up to 700 N, as well as bone quality and volume.

Masticatory forces are a crucial element in the insertion process. A successfully functioning dental implant can resist masticatory forces and deliver them proportionally to intraoral tissues over an extended period of time.

By definition, masticatory or bite forces are produced by the collaboration of the masticatory muscles, the maxilla and mandible jaw, the teeth and the temporomandibular joints.

Volume and quality of bone tissue of jaw are also critical elements for deliberate anatomical positioning and proper angularity in the dental implant insertion process, particularly for edentulous patients.

It is essential that the dental implant be inserted at the proper approach with respect to the individual structure of the alveolar bone and volume of the patient's masticatory forces. Successful insertion requires a reliably accurate method for determining the relationship among masticatory force loads, stress distribution, size of jaw, optimal number of dental implants to support a prosthesis, and the most desirable position of these implants to minimize biomechanical complications. Thus, there is a need for a dental device designed to measure alveolar arch parameters and size of the jaw.

The innovation offered for patent meets that multi-faceted need. It provides an algorithm to numerically analyze all the above-mentioned factors related to insertion accuracy and effectively calculates the optimal position for dental implants in edentulous patients.

BRIEF SUMMARY AND OBJECT OF THE EMBODIMENT

In response to the previously described clinical challenges facing dental surgeons, a unique and effective algorithm has been created to support the innovative method of using arch parameters to determine the ideal position for dental implants in edentulous patients. The algorithm is generated by the new and advanced dental device that measures dental arch parameters.

The purpose of the embodiment is to increase measurement precision in the sagittal, vertical and horizontal planes of patient jaws or cast models to determinate the ideal position for dental implants.

The terms "proximal" or "mesial" and "distal" are used herein with reference to a dental provider operating the handle portion of the dental device. The term "proximal" refers to the section closest to the dentist, the term "mesial" refers to the section closest to midline of the patient mouth and the term "distal" refers to the section located away from the dental provider.

The terms "sagittal", "vertical" and "horizontal" planes are used herein with reference to a dental surgeon controlling the handle portion of the dental device during measuring. However, the dental device is used in many orientations and positions, and these terms are not intended to be limiting and/or absolute.

The purpose of the embodiment is simultaneous measurement of the dental alveolar ridge or dental arch or apical base of human jaw, and structural optimization of those measurements along with masticatory force loads and stress distribution to establish accurate parameters for properly positioning dental implants in edentulous patients to determine the ideal position for chosen number of dental implants and relation to considering masticatory forces loads and stress distribution for edentulous patients.

Additionally, this innovative device, method and algorithm could be adapted for use in other medical fields such as general surgery and orthopedics.

A dental device with a handheld housing, main bar, middle bar, secondary bar, and chin support plate for the purpose of measuring arrangements and amounts of distance in the mouth is described herein. The dental device is developed to measure dental arch parameters wherein the handheld housing portion of the dental device has a vertically integrated symmetrical design with contoured spaces on the handle component that securely anchor the operator's thumb, index finger, ring finger and little fingers. The dental device is developed to measure dental arch parameters where the handle also contains the horizontal wheel positioned in front of handheld housing and the vertical wheel located on the back of the handheld housing. The dental device could also include one wheel that operates the position of the middle bar, and the other wheel functions to change the length of the middle bar. The dental device could also include a handheld housing has a quadrangular rear section that ends with an extension rod attached to main wheel. The dental device could also include a secondary bar consisting of two sections that are perpendicular to the main bar in opposite directions with fastening elements comprised of locking arched stoppers at both ends. These stoppers are placed on the surface of the alveolar ridge to support and stabilize the dental device inside the patient's mouth during the measuring process. The dental device could also include an extension rod and the main wheel allow operation of the secondary bar and fastening elements from the outside of the patient's mouth. The dental device could also include moving the rod back and forth to change the position of the fastening elements in the sagittal plane, and rotating the main wheel on its axis will change the length of the secondary bar extensions in the transverse plane. The dental device could include a middle bar consists of a pair of arms extending perpendicular from the main bar in opposite directions. The dental device could include extending arms of the middle bar to contain a measurement scale designed to measure the length of the apical basis on the jaw or cast model or working distances with the highest precision. The dental device could include a chin support plate that is connected to the handle with two parallel curved beams for better stabilization of the dental device during measuring. The dental device could include mechanical parts to be reworked for a robotic process or for classic combinations of gearwheel systems, servomechanisms, transmissions or pulley systems and the like.

A new method of parametrization of the alveolar bone arch and the corresponding relationship between size of the alveolar bone arch or jaw is described herein. The number of chosen dental implants and movements in all directions is generated by masticatory forces to determine the desired position of dental implants in the alveolar bone. The process involves (1) identifying at least four intraoral reference landmarks in the patient jaw dental arch or residual bone ridge or cast model or be part of any dental implant planning or design software; (2) performing parametrization of the alveolar bone arch from outside the mouth; (3) integrating data into the system base of two-dimensional (2D), three-dimensional (3D), or four dimensional (4D) dental implant planning or design software or any other software using an algorithm; (5) capturing by dental device the parameterized data measurements on the identified features; and (6) selecting an algorithm to be used for processing each of the measurements using the calculated characteristics.

The method could include the first step of parametrization is identifying four intraoral reference landmarks in the jaw such as points A, B, C, D. The method could include the second step of parametrization is identifying the line connecting the reference landmarks points A and C and as a crucial posterior border of future dental prosthesis. The method could include the next step of parametrization is identifying as the next step of parametrization is identifying as the reference landmark point D located in the middle of junction line connecting landmark points A and C. The method could include the next step of parametrization is defining by six measurements of distance between these reference landmark points. The method could include the next step of parametrization is defining vertical length H, where H is defined by the distance from intraoral landmark point D and point B and six horizontal lengths S1-S5. The S1, S2, S3, S4, S5 are horizontal dimensions that are taken at five different points, which evenly divide the distance from line A-D-C and point B or end to back end. The method could include the next step is extracting number of parametrization futures. The method could include the next step of selecting the algorithm. The method could include the algorithm can be customized to provide any output desired such as internal forces in the structure, coordinates of the position of the implants, and others. The method could include an algorithm that finds the optimal position for insertion of the dental implants for a certain load case. The method could include an algorithm that changes the positions of the implants until it finds the optimal location that minimizes the section forces and movements. The method could include identifying statistical characteristics of the featured parameter measurements and solves surgical and prosthodontics problems with an actual representation and expected calculation time to select the current algorithm.

Additionally, this innovative 3-part system of device, method and algorithm can be utilized in other medical fields beyond dentistry and orthodontics such as general surgery or other procedures involving implants.

A dental measurement apparatus is described herein. The dental measurement apparatus is made up of a handheld housing; an elongated shaft passing through the handheld housing proximate to the top of the handheld housing, said elongated shaft adjustable in length from an end of the elongated shaft and the handheld housing; a middle bar perpendicular to and passing through the elongated shaft proximate to a center of the elongated shaft, said middle bar adjustable in position along the length of the elongated shaft and adjustable in position distance from the elongated shaft and an end of the middle bar; a secondary bar perpendicular to and passing through the elongated shaft proximate to the end of the elongated shaft, said secondary bar adjustable in position distance from the elongated shaft and an end of the secondary bar; at least one arcuate beam passing through the handheld housing, said at least one arcuate beam adjustable in distance from the handheld beam; and a plate for chin support connected to the arcuate beam.

The dental measurement apparatus could further include a secondary bar extension, extending from the secondary bar, adjustable in distance from the end of the secondary bar and an end of the secondary bar extension and/or a fastening element, the fastening element connected to the end of the secondary bar extension. The dental measurement apparatus could include a vertical knob, said vertical knob mounted on the handheld housing and connected to the middle bar through the elongated shaft, wherein rotating the vertical knob adjusts the length of the middle bar from the end of the middle bar and the elongated shaft and/or a horizontal knob, the horizontal knob mounted on the handheld housing and connected to the middle bar through the elongated shaft, wherein rotating the horizontal knob adjusts the positional distance of the middle bar from the end of the elongated shaft. The dental measurement apparatus could further include a main rotary knob, said main rotary knob mounted on an opposite end of the elongated shaft and connected through the elongated shaft and the secondary bar to the secondary bar extension, wherein rotating the main rotary knob adjusts the length of the secondary bar extension. Pushing or pulling of the main rotary knob could adjust the positions of fastening element in sagittal plane.

The dental measurement apparatus could include a positional sensor connected to the middle bar, or secondary bar, of arcuate beam. A microprocessor could be electrically connected to the positional sensor(s). The microprocessor could calculate the dental parameters using values from the positional sensor. The microprocessor could transmit the dental parameters to a smartphone using a Bluetooth transceiver and/or a Wifi transceiver.

A method for measuring dental parameters is also described here. The method is made up of (1) specifying a number of dental implants; (2) inserting a dental measurement device into a mouth of a patient, where the dental measurement device comprises a handheld housing, an elongated shaft passing through the handheld housing proximate to the top of the handheld housing, the elongated shaft adjustable in length from an end of the elongated shaft and the handheld housing, a middle bar perpendicular to and passing through the elongated shaft proximate to a center of the elongated shaft, the middle bar adjustable in position along the length of the elongated shaft and adjustable in position distance from the elongated shaft and an end of the middle bar, a secondary bar perpendicular to and passing through the elongated shaft proximate to the end of the elongated shaft, the secondary bar adjustable in position distance from the elongated shaft and an end of the secondary bar, at least one arcuate beam passing through the handheld housing, the at least one arcuate beam adjustable in distance from the handheld housing, and a plate for chin support connected to the arcuate beam; and a plurality of positional sensors on the middle bar and secondary bar; (3) collecting the dental parameters from the plurality of sensors; (4) calculating, using the dental parameters, at least four intraoral reference landmarks in the patient jaw dental arch, residual bone ridge, and cast model; and (5) integrating the four intraoral reference landmarks into the system base of two-dimensional (2D), three-dimensional (3D), or four dimensional (4D) dental implant planning or design software or any other software.

The method of measuring dental parameters could further include (6) calculating locations and positions to place implants. The calculating of the at least four intraoral reference landmarks could be performed in a microprocessor on the dental measurement device and/or in a smart phone connected to the dental measurement device through a WiFi transceiver and/or in a computer connected to the dental measurement device through a Bluetooth transceiver. The adjustment of the middle bar could be effectuated through the turning of a knob.

To further explain the details of this innovation, a set of drawings and diagrams with their corresponding descriptions is provided below.

BRIEF DESCRIPTION OF THE DRAWINGS

FIG. 9 is a diagram of the output of the coordinates corresponding code for chosen 2, 4 or 6 dental implants (command window).

FIG. 10 is a diagram of the corresponding code.

DRAWING-REFERENCE NUMERALS

Figure 1:
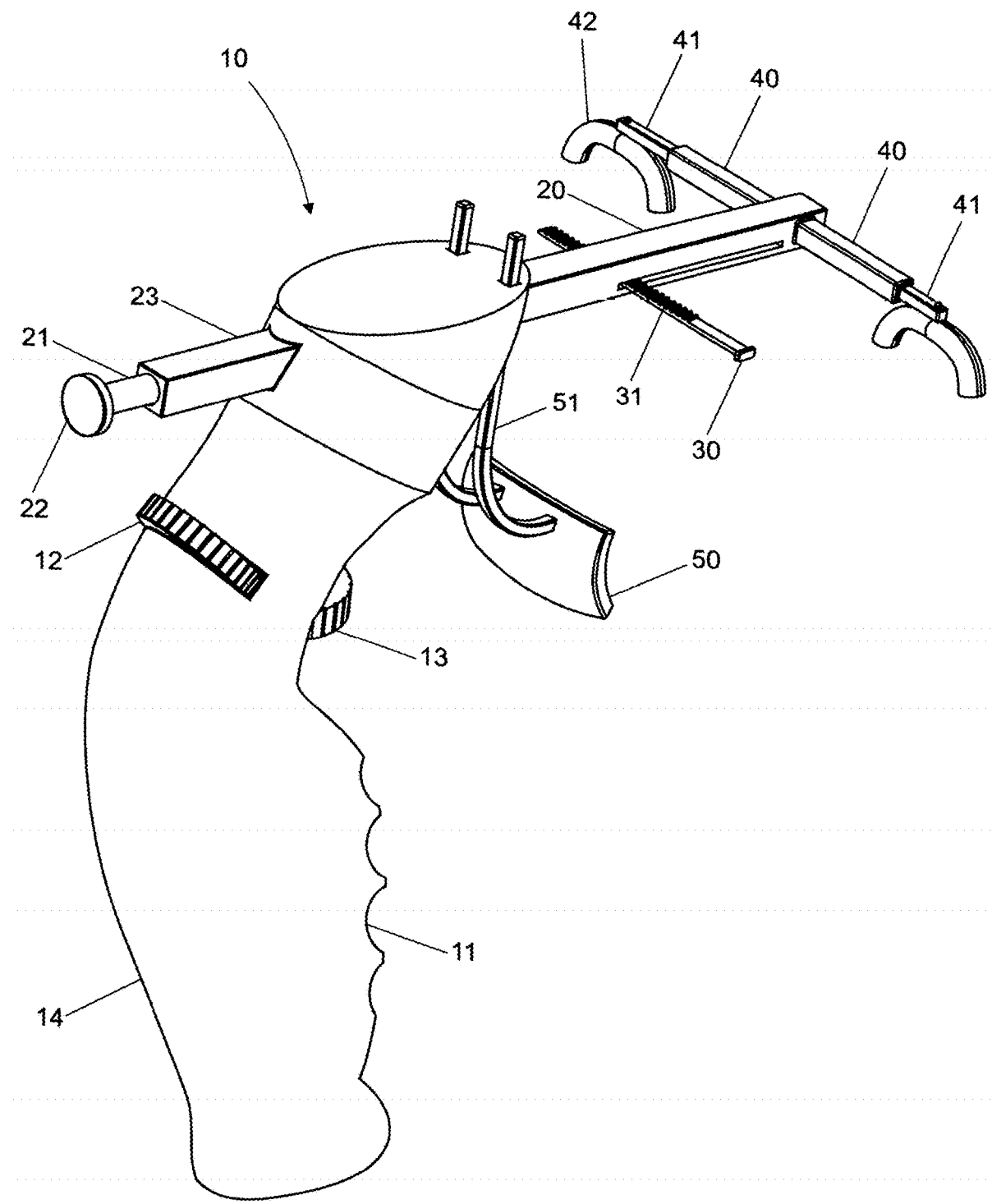
FIG. 1 is a perspective view of the dental measuring device.
Figure 2:
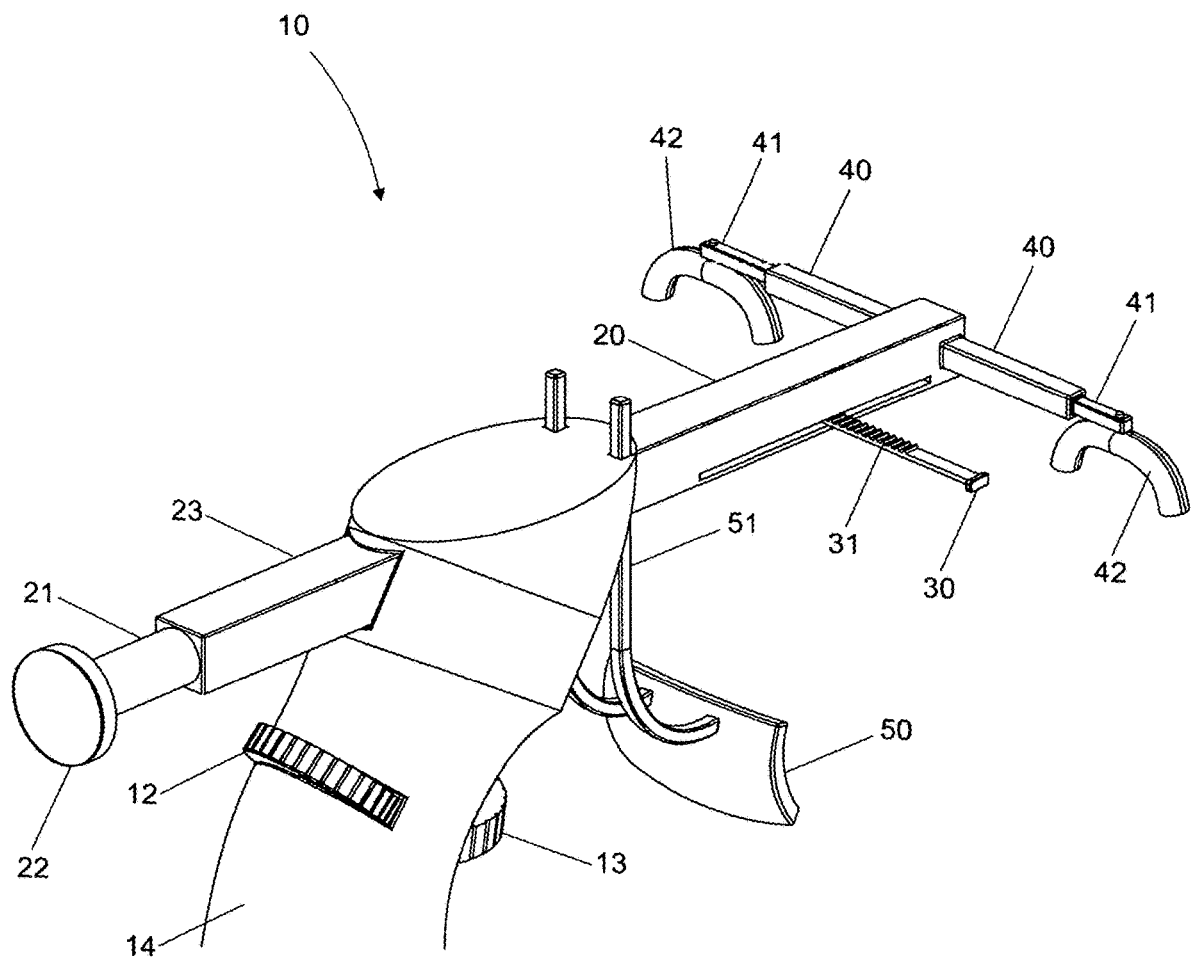
FIG. 2 is a perspective view of a portion of the dental measuring device.
Figure 3:
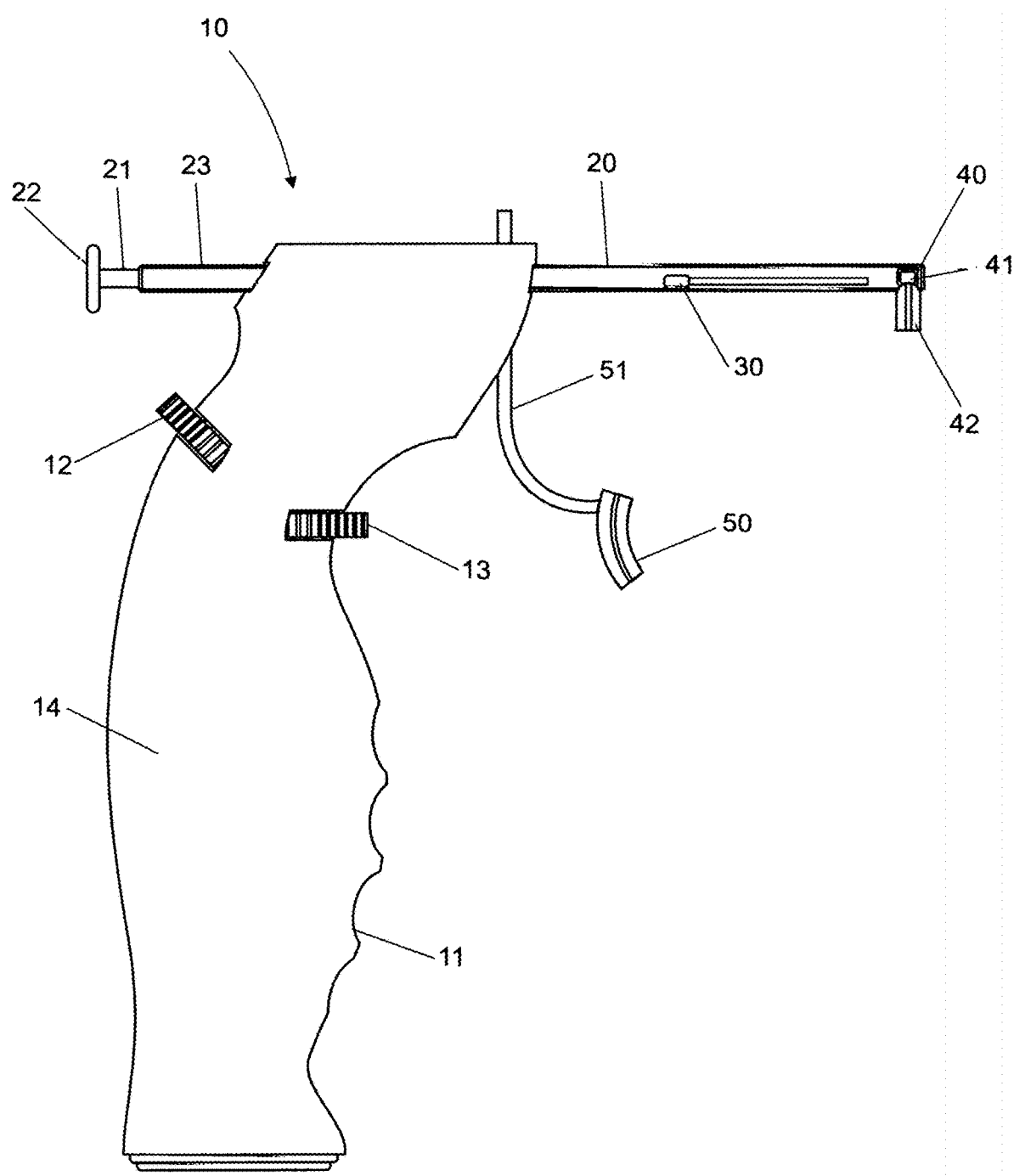
FIG. 3 is a side elevation view of the dental measuring device.
Figure 4:
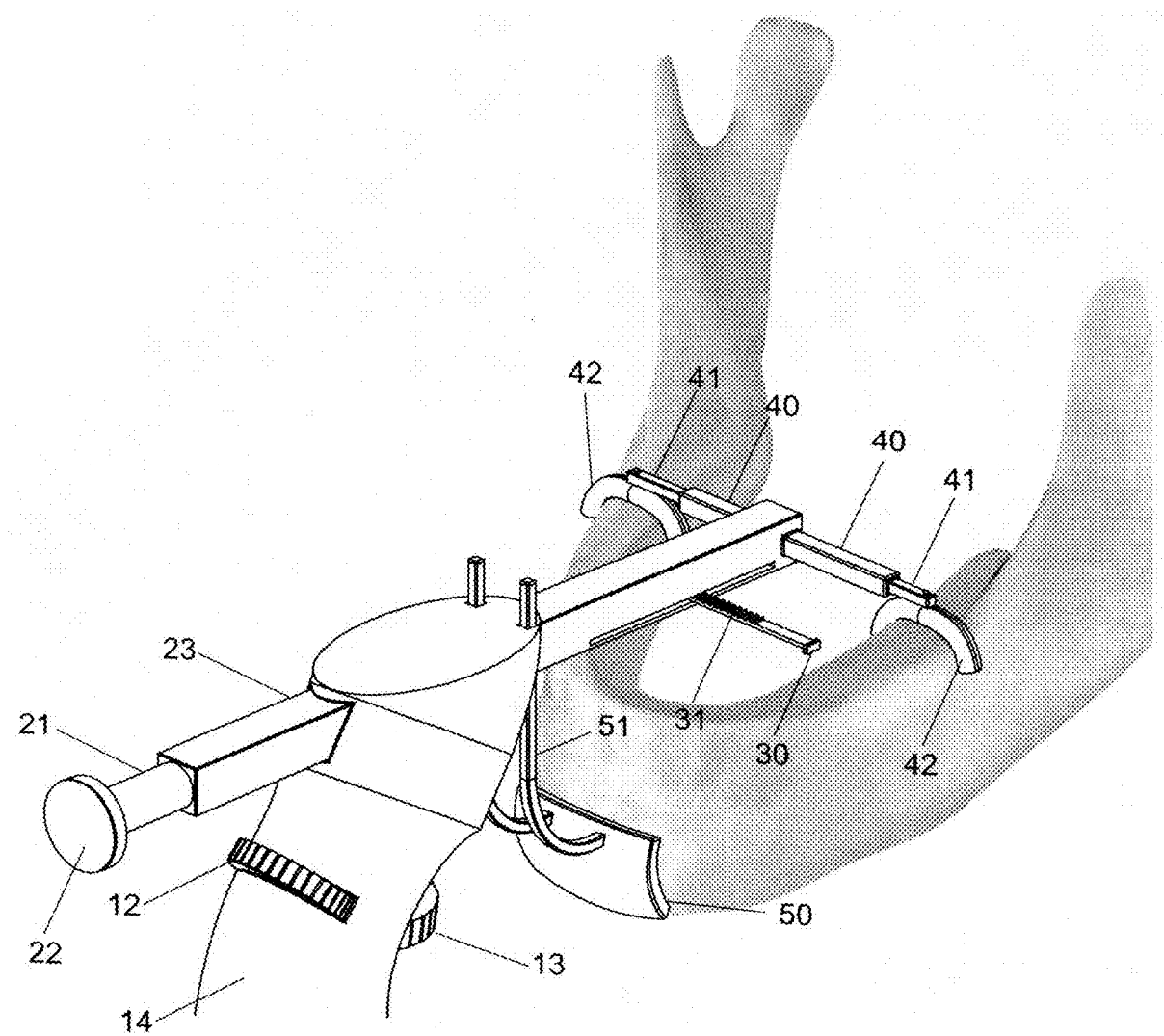
FIG. 4 is an illustration of illustration of the dental measuring device in a patient's mouth.

10 Dental Measuring Device
11 Handheld housing
12 Vertical rotary knob
13 Horizontal rotary knob
14 Body of Handheld housing
20 Elongated shaft
21 Extension rod
22 Main rotary knob
23 Rear section
30 Middle bar
31 Arm with measurement scale
40 Secondary bar
41 Secondary bar extensions
42 Fastening elements
50 Plate for chin support
51 Arcuate beam
60 Alveolar ridge
61 Human jaw

DETAIL DESCRIPTION

A further object of the present invention is the innovative dental measuring device 10 as shown in FIGS. 1-4.

The dental device 10 is an apparatus for measuring the arrangement and amount of distance between mesial and distal intraoral reference landmarks of the alveolar bone ridge in transverse and sagittal planes (see FIGS. 1-4) or anterior and posterior borders respectively of future dental prostheses.

The device also makes it possible to measure the width and length of the alveolar bone ridge of the jaw or the apical base of the jaw, to obtain section measurements of the jaw models, and to determine the desired position of a dental implant in the alveolar bone in consideration of bite forces and movements in all directions.

The present embodiment comprises a handheld housing 11, elongated shaft 20, middle bar 30, secondary bar 40 and plate for chin support 50 (see FIGS. 1-4).

The handheld housing 11 of this dental measuring device 10 has a vertically integrated symmetrical design and can be held and controlled by either the right or left hand of an operator. The handheld component between thumb, index finger, ring finger and little finger create the body 14 for the dental device and contains several rotary knob inputs such as the vertical rotary knob 12 and the horizontal rotary knob 13 (see FIGS. 1-4). The horizontal rotary knob 13 is positioned in front of the handheld housing 11 and the vertical rotary knob 12 is located in the back of the device handle (FIGS. 1-4).

The function of these two knobs located on the handle of the dental device 11 is to help the dental practitioner operate the middle bar 30 from outside of the patient's mouth (FIGS. 1-4). The knobs change the length of the middle bar 30 varying the number, position, type and function of these inputs (12, 13).

Other components of the handheld housing 11 are a quadrangular rear section 23 connected to a round bar that is an extension rod 21 and is attached to the main rotary knob 22 (FIGS. 1-4).

The handheld housing 11 tapers to a rectangular front section supporting the elongated shaft 20 designed to be inserted into the patient's mouth.

The extension rod 21 and the main rotary knob 22 combine to allow the dental surgeon to operate the secondary bar 40 from the outside of the patient's mouth and apply a rotational load on secondary bar 40.

As shown in FIGS. 1,2,3,4, pulling and pushing the rod 21 adjusts the positions of fastening elements 42 in sagittal plane. Clockwise or counterclockwise turning of the main rotary knob 22 or controlling the rotational load changes the length of the secondary bar's 40 extensions 41 in the transverse plane.

The secondary bar 40 consists of two sections 41 that are perpendicular to the elongated shaft 20 in opposite directions with fastening elements comprised of locking arched stoppers 42 at both ends of the bar.

The main function of the secondary bar 40 is to support and stabilize the dental measuring device in the mouth of the patient or on the cast model. This is accomplished by placing the locking arched stoppers 42 on the surface of alveolar ridge 60 of the human jaw 61 during the measuring process (see FIG. 4).

The device's middle bar 30 consists of a pair of arms 31 extending perpendicular to the elongated shaft 20 in opposite directions. These extension arms 31 of the middle bar 30 contain a measurement scale designed to measure the length of the apical basis of the jaw or cast model or working distances with the highest precision.

The dental inventions include a chin support plate 50 that is connected to the handle 11 with two parallel curved beams 51. The plate's purpose is to stabilize the dental device 10 for measurement accuracy. (FIGS. 1-4).

Each axis has a sensor 1201, 1202, 1203, 1204, 1205 to precisely determine position. These sensors could be laser diode sensors that measure distance with the light. Alternatively, these positional sensors could use Capacitive displacement, Eddy-currents, Hall effect, inductive, Laser Doppler vibrometer (optical), Linear variable differential transformer (LVDT), Photodiode array, Piezo-electric transducer (piezo-electric), Potentiometer, Proximity sensor (optical), String potentiometer (also known as string pot, string encoder, cable position transducer), Position encoders such as Absolute encoder, Incremental encoder, Linear encoder, Rotary encoder, or Ultrasonic sensor. The sensors could be connected to the knobs 12, 13, 21, 22, determining the change in position indicated when the user twists or pulls the knob. Alternately, the positional sensors 1202, 1203, 1204 could be connected to the elongated shaft 20 measuring the vertical and horizontal position of the middle bar 30 and of the position of the secondary bar 40. Further sensors 1205 could be connected to the secondary bar 40 to measure the secondary bar extensions 41. An additional sensor 1201 could measure the depth of the plate for the chin support 50 by determining the length of the accurate beams 51.

Although specific components of the inventions have been featured in detail for illustrative purposes, the device may undergo periodic modifications including variation and rearrangement of parts for enhanced performance. For example, the device's mechanical parts could be reworked for a robotic process or for classic combinations of gearwheel systems, servomechanisms, transmissions or pulley systems and the like.

Another purpose of the proposed innovative dental system is to provide a new method of identifying and evaluating the relationship among parameters of the alveolar bone arch, masticatory forces and the multi-directional movements they generate to develop an algorithm that can determine the ideal placement for a dental implant in the alveolar bone. Evaluation of masticatory forces is particularly challenging because they create six degrees of multi-directional movements: three translation movements and three rotational movements.

The dental device operation is controlled outside the mouth to measure the alveolar bone arch parameters within the mouth. The data will be integrated to the system base of two-dimensional (2D), three-dimensional (3D), or four-dimensional (4D) dental implant planning or design software or any other software using an algorithm.

The concept of operating the dental device outside the mouth also applies to dental casts or molds and dental or diagnostic models.

Figure 5:
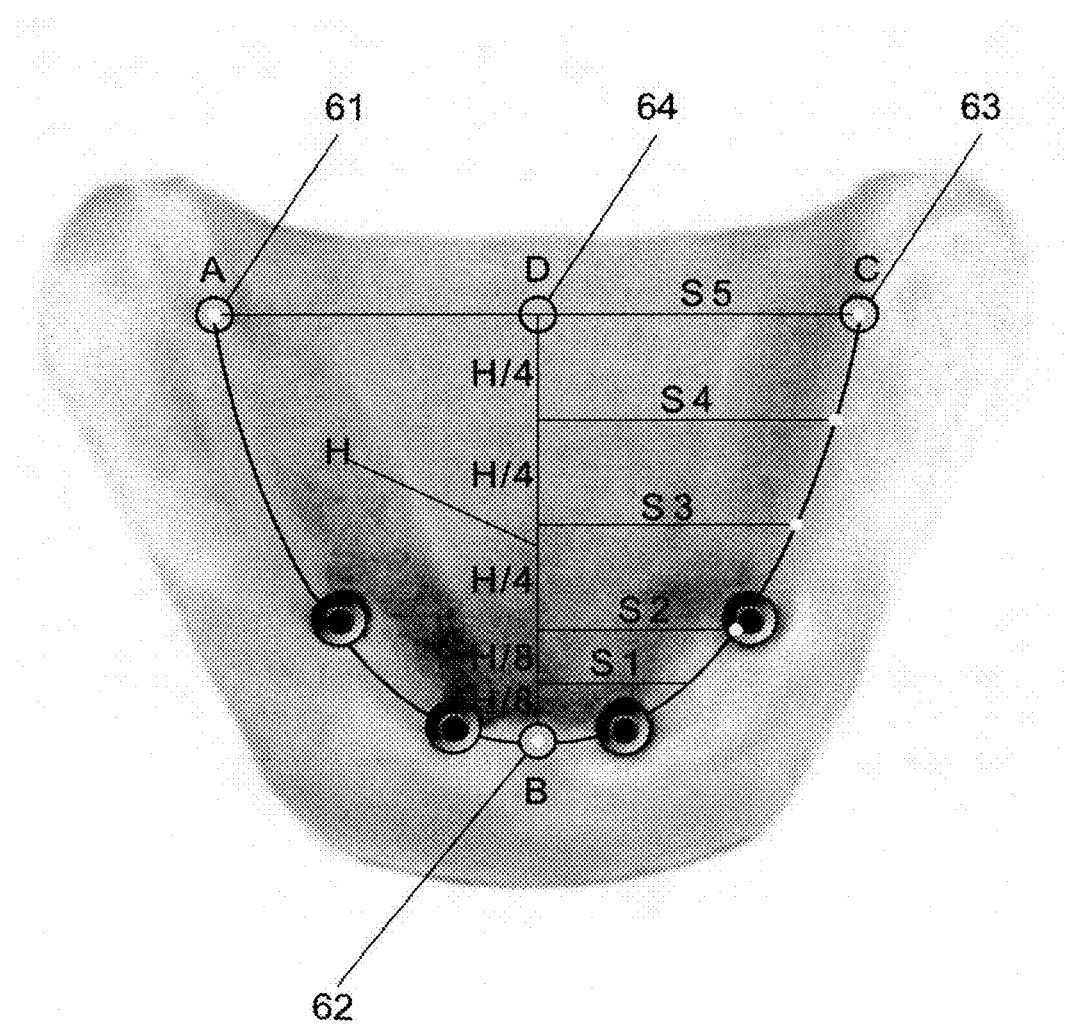
FIG. 5 is a diagram of parameterization of the alveolar bone arch.

As a shown in FIG. 5, the first step of this measuring method is to mark and define the dental arch or residual ridge. The parameters are marked by four intraoral reference landmarks in the jaw as points A, B, C, D. The points A and C and the line connecting them is defined as a crucial posterior border of a future dental prosthesis. The reference point B denotes the anterior border of a dental prosthesis. Reference point D is located in the middle of the junction line connecting points A and C and is defined by six measurements of distance between these points (FIG. 5).

The term "anterior" refers to the position closest to the medical provider and the term "posterior" refers to the position located away from the medical provider. For convenience and clarity, spatial terms such as "vertical" and "horizontal" may be used herein with respect to the drawings. However, the dental device is used in many angles and positions, and these terms are not intended to be limiting and/or absolute.

The six defined measurements between the aforementioned intraoral landmarks are vertical length H, where H is defined by the distance from intraoral landmark points D and B, and five horizontal lengths S1-S5. The S1, S2, S3, S4, S5 are horizontal dimensions that are taken at five different points, which evenly divide the distance from line A-D-C and point B or front end to back end (FIG. 5).

This innovative dental system also develops an algorithm that investigates the optimal positioning of a chosen number of implants in consideration of Six degrees of freedom movements—three translation movements and three rotational movements—on each node along with bite or masticatory forces generated in all directions.

The algorithm analyzes the measurement distances obtained from the dental device to determine the desired position of dental implants based on the relationship among the number of chosen implants, size of the jaw, design of dental prosthesis and masticatory forces capability. The number of implants can be 2, 4, or 6.

The algorithm runs on a programming language called GNU Octave/MATLAB. The algorithm may be converted to the Python programming language, which will allow graphic user interface.

Description of the Algorithm

The algorithm GNU Octave is used, which is an open-source programming language for numerical computations. It solves the finite element problem the software package CALFEM used that has already been implemented in Octave software.

After defining the dental arch by the six parameters, several coordinates are selected for increasing the precision of the results. The obtained jaw data is then transformed into a finite element structure.

Figure 6:
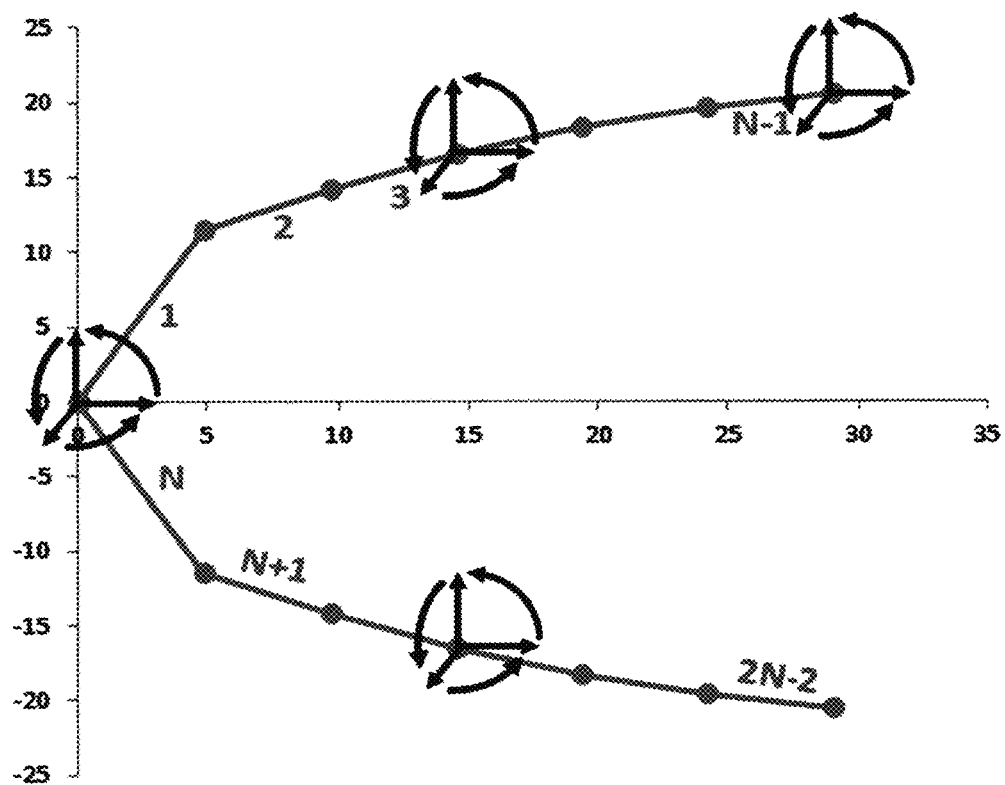
FIG. 6 is a diagram of the model approach using 6 degrees of freedom movements (DOF).

Therefore, the arch is divided into several beam elements that are connected by the nodes. The 2D structure defines Six degrees of freedom movements comprised of three translation movements and three rotation movements on each node in order to apply forces and movements in all directions (FIG. 6). This ensures that the algorithm finds the optimal position for inserting the dental implants for a certain case load.

The dental implant is restricted in all six degrees of freedom. This means it cannot move or rotate in any direction. By applying forces and bending movements, a load case is defined in order to solve the structural problem. Using a finite element analysis algorithm, calculations are performed to determine the displacements and section forces of the whole structure.

The algorithm analyzes potential implant positions until it finds the optimal data combination for the implants that minimizes the section forces and movements.

Due to linearity of the problem the material properties of the structure are not relevant. The criteria used to determine the best position of the implants compares the results obtained for every possible configuration of the boundary conditions, and then the configuration that minimizes the maximum values for the bending movement is chosen.

These criteria need to be optimized, and it is recommended that they are compared with experimental results. It has been found that the position of the implants calculated by the algorithm strongly depends on the force case provided.

The criteria used to determine the best position of the implants compares the results obtained for every possible configuration of the boundary conditions, and then the configuration that minimizes the maximum values for the bending movement is chosen.

Algorithm Input and Output

The availability of distances is required to start the algorithm (FIG. 5). It is also necessary to define the number of elements to be used in the analysis. The bigger the number is, the more accurate the results, but also the longer the time required to compute the result.

The dental surgeon must also indicate the chosen number of implants to be analyzed, 2, 4 or 6.

Figure 7:
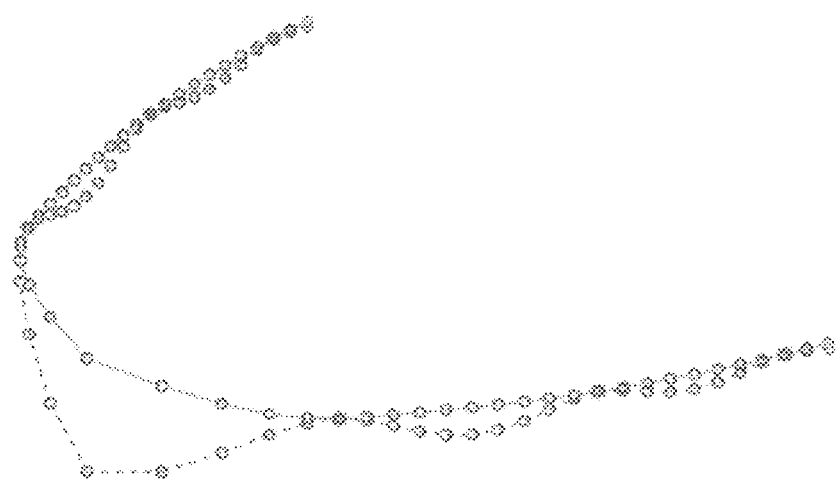
FIG. 7 is a diagram of the optimal position for the implants by algorithm's output.

After providing the required input, the algorithm proceeds to determine the best position in which to place the implants. An example of the algorithm's output with the optimal position for the implants is shown (FIG. 7).

In the figure (FIG. 7) the red dots represent the position where the implants should be placed. The deformation is exaggerated so that it can be appreciated. The algorithm can be customized to provide any output desired such as internal forces in the structure and coordinates of the position of the implants.

Figure 8:
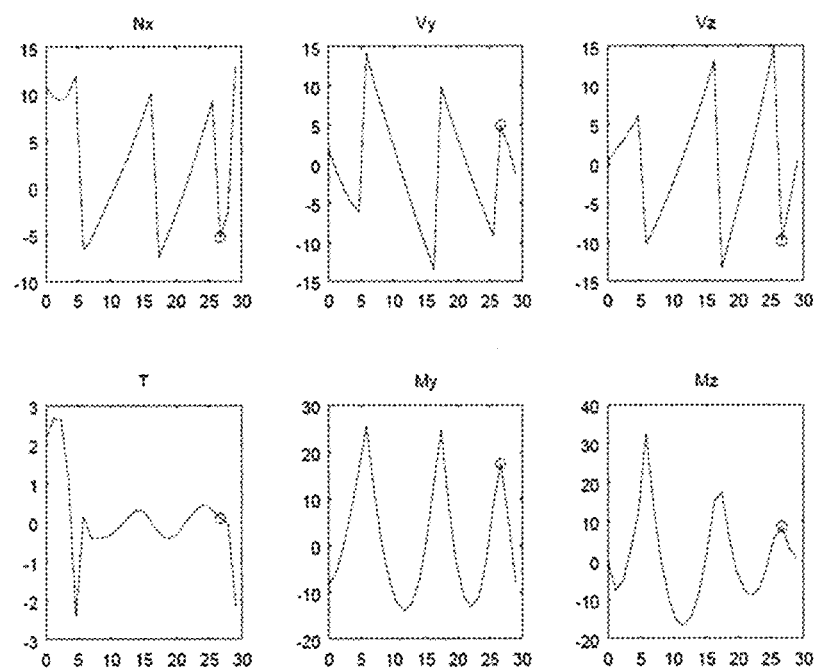
FIG. 8 is a diagram of the output of the section forces.

The output of the section forces, and internal force in the structure is given in graph(s) Nx, Vy, Vz, T, My, Mz (FIG. 8). The magnitude of the forces may have an impact on the change in position of the implants. These diagrams will be displayed for the optimal positions of the implants. The observation that the bending movement in diagram My is dominating on average, thus is taken as selection criteria.

Moreover, these diagrams (FIG. 8) identify where the jaw is subjected to high stresses for a certain load case.

Finally, the command window gives the output in the directions of the x-, y-, and z-axes coordinates for implant position (FIG. 9). This is the important output, as it shows the optimal or ideal position for insertion of dental implants.

Furthermore, the load case can be modified. We chose a case with forces in all directions that would occur while chewing. The output of the coordinates' corresponding code for chosen 2, 4 or 6 dental implants (command window) is shown in FIG. 10.

The linearly distributed load corresponds to Equation 1 below $$F_z(x) = -100\ N - \frac{400\ N}{H}x$$

The vertical or normal force on each node increases when getting closer to the molar region. The sheer or transversal forces on the other hand are constant along the dental arch in our chosen load case. In x-axis direction the sheer force is 3N on each node. This equation was optimized through experiments.

Figure 11:
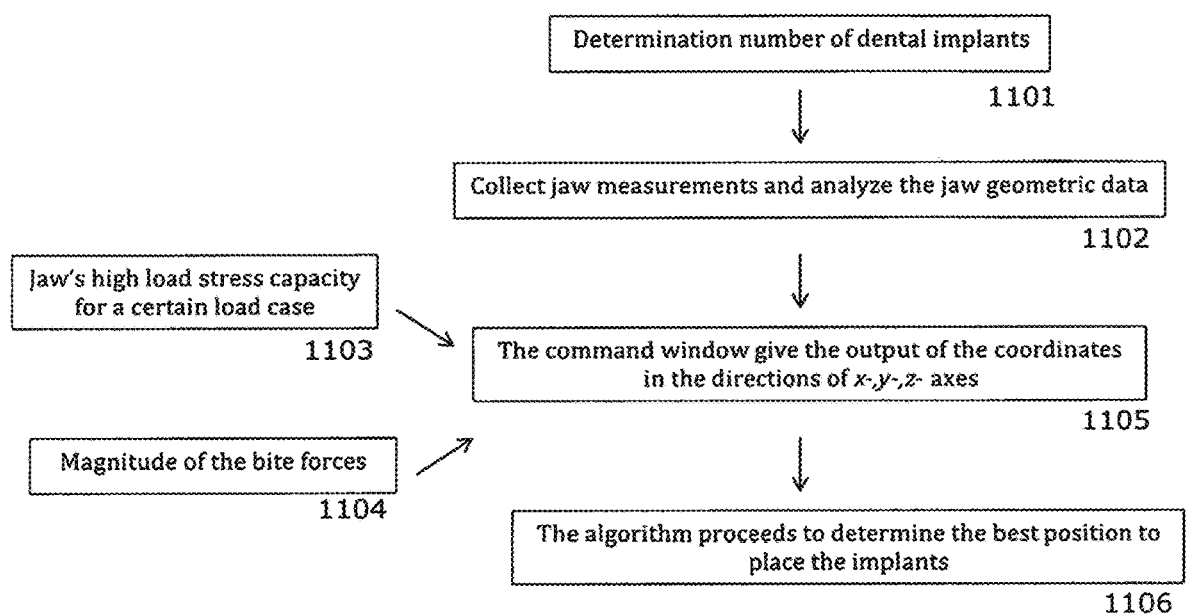
FIG. 11 is a schematic view of multi-component structure of the algorithm used to collectively process the measurements according to the inventions.

FIG. 11 refers to a schematic view of the multi-component structure of the algorithm used to collectively process the measurements according to the inventions.

First the number of dental implants is determined 1101. Once the number is determined, the jaw is measured using the dental measuring device 11. The jaw measurements are analyzed 1102. These measurements are combined with the Jaw's high stress capacity for certain load cases 1103 and the magnitude of the bite forces 1104. The combined factors are calculated to define the x, y, and x coordinates 1105. Once the coordinates are determined, the algorithm proceeds to determine the best position in 6 axis to place the implants 1106.

The present inventions include an assembly for the dimension measuring sensors 1201, 1202, 1203, 1204, 1205 for greater sensitivity and accuracy in distance determination. An advantageous embodiment of the present inventions provide that the laser distance sensor 1201, 1202, 1203, 1204, 1205 is designed for phase position measurement.

The inventions relate to unit as laser diode 1202, located in the middle bar 30 of dental measuring device with a laser distance sensor 1202, wherein the laser distance sensor 1202 is modified to determine by means of a laser ray, the distance, wherein the control unit is adapted, depending on measurement data related parameters of the laser distance sensor 1202 and transferring to a microprocessor 1206 for data calculations.

Moreover, calculated measuring data possibly sent over Bluetooth network to a computer 1212 or mobile device 1211, where the calculations are performed using present algorithm and transfer to the 2-D, 3-D or 4-D model.

Figure 12:
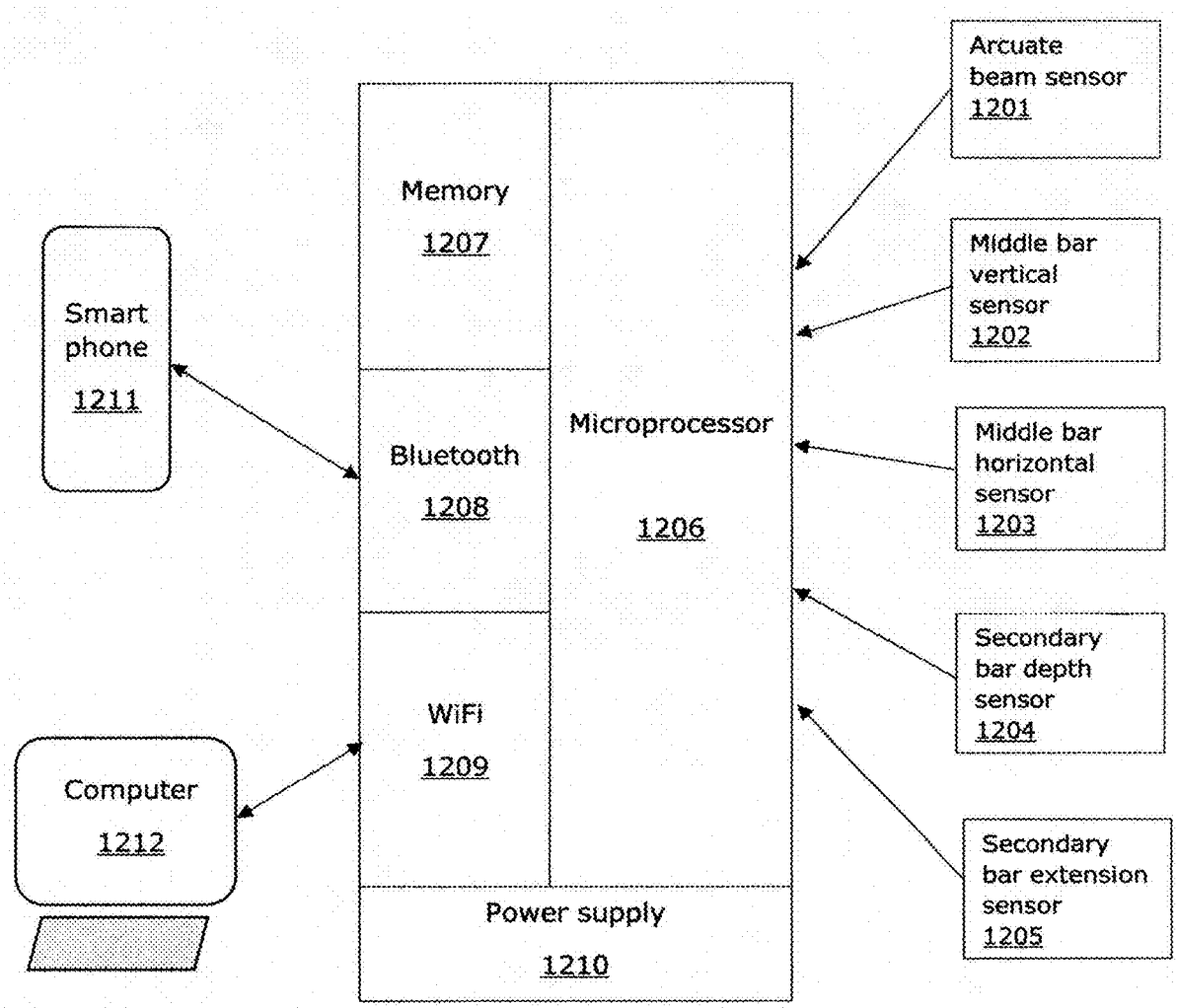
FIG. 12 is a schematic view of the electrical connections of the sensors and the processor.

FIG. 12 shows the electrical connection from the dental measuring device 10 to computing devices 1211, 1212. The sensors 1201, 1202, 1203, 1204, 1205, could be any of a variety (or combination) of positional sensors that provide electrical information on the position of the accurate beam 51, the middle bar 30, and the secondary bar 40. The sensors 1201, 1202, 1203, 1204, 1205 are electrically connected to the microprocessor 1206. The microprocessor 1206 is connected to memory 1207 and one or more communication channels (Bluetooth 1208 and/or WiFi 1209). A power supply 1210 is also connected to the memory 1207, microprocessor 1206, Bluetooth transceiver 1208, WiFi transceiver 1209, and the sensors 1201, 1202, 1203, 1204, 1205.

The Bluetooth transceiver 1208 wirelessly communicates with the smart phone 1211 and/or the computer 1212. The WiFi transceiver 1209 wirelessly communicates with the smart phone 1211 and/or the computer 1212. The communications could include the raw sensor values, the sensor values processed to return position information, and/or location information on where to place implants.

The algorithm in FIGS. 10 and 11 could be executed on the microprocessor 1206, the smart phone 1211, or the computer 1212. The smartphone 1211 and/or the computer 1212 could display the location information on where to place the implants or could input this information into other software to graphically display a model of the implants.

In an alternate embodiment, the sensors 1201, 1202, 1203, 1204, 1205 could each be wireless sensor devices that connect directly to the smart phone 1211 and/or the computer 1212 through Bluetooth, NFC, WiFi or similar device.

In still another embodiment, the sensors 1201, 1202, 1203, 1204, 1205 could be directly connected to the computer 1212 through a wire bundle.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims. All dimensions are given as examples, and may be changed without detracting from the inventions herein.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

What is claimed is:

1. A dental measurement apparatus comprising:
    a handheld housing;
    an elongated shaft passing through the handheld housing proximate to top of the handheld housing, said elongated shaft adjustable in length from an end of the elongated shaft and the handheld housing;
    a middle bar perpendicular to and passing through the elongated shaft proximate to a center of the elongated shaft, said middle bar adjustable in position along the length of the elongated shaft and adjustable in position distance from the elongated shaft and an end of the middle bar;
    a secondary bar perpendicular to and passing through the elongated shaft proximate to the end of the elongated shaft, said secondary bar adjustable in position distance from the elongated shaft and an end of the secondary bar;
    at least one arcuate beam passing through the handheld housing, said at least one arcuate beam adjustable in distance from the handheld housing; and
    a plate for chin support connected to the arcuate beam.

2. The apparatus of claim 1 further comprising a secondary bar extension, extending from the secondary bar, adjustable in distance from the end of the secondary bar and an end of the secondary bar extension.

3. The apparatus of claim 2 further comprising a fastening element, the fastening element connected to the end of the secondary bar extension.

4. The apparatus of claim 1 further comprising a vertical knob, said vertical knob mounted on the handheld housing and connected to the middle bar through the elongated shaft, wherein rotating the vertical knob adjusts the length of the middle bar from the end of the middle bar and the elongated shaft.

5. The apparatus of claim 1 further comprising a horizontal knob, said horizontal knob mounted on the handheld housing and connected to the middle bar through the elongated shaft, wherein rotating the horizontal knob adjusts the positional distance of the middle bar from the end of the elongated shaft.

6. The apparatus of claim 1 further comprising a main rotary knob, said main rotary knob mounted on an opposite end of the elongated shaft and connected through the elongated shaft and the secondary bar to a secondary bar extension, wherein rotating the main rotary knob adjusts the length of the secondary bar extension.

7. The apparatus of claim 6 wherein the pushing or pulling of the main rotary knob adjusts the positions of a fastening element in a sagittal plane.

8. The apparatus of claim 1 further comprising a positional sensor connected to the middle bar.

9. The apparatus of claim 8 further comprising a microprocessor electrically connected to the positional sensor.

10. The apparatus of claim 9 wherein the microprocessor calculates dental parameters using values from the positional sensor.

11. The apparatus of claim 10 wherein the microprocessor transmits the dental parameters to a smartphone using a Bluetooth transceiver.

12. The apparatus of claim 10 wherein the microprocessor transmits the dental parameters to a computer using a Wi-Fi transceiver.

13. The apparatus of claim 1 further comprising a positional sensor connected to the secondary bar.

14. The apparatus of claim 1 further comprising a positional sensor connected to the arcuate beam.

15. A method for measuring dental parameters, the method comprising:
    specifying a number of dental implants;
    inserting a dental measurement device into a mouth of a patient, wherein the dental measurement device comprises a handheld housing, an elongated shaft passing through the handheld housing proximate to a top of the handheld housing, said elongated shaft adjustable in length from an end of the elongated shaft and the handheld housing, a middle bar perpendicular to and passing through the elongated shaft proximate to a centre of the elongated shaft, said middle bar adjustable in position along the length of the elongated shaft and adjustable in position distance from the elongated shaft and an end of the middle bar, a secondary bar perpendicular to and passing through the elongated shaft proximate to the end of the elongated shaft, said secondary bar adjustable in position distance from the elongated shaft and an end of the secondary bar, at least one arcuate beam passing through the handheld housing, said at least one arcuate beam adjustable in distance from the handheld housing, and a plate for chin support connected to the arcuate beam, and a plurality of positional sensors on the middle bar and secondary bar;
    collecting the dental parameters from the plurality of sensors;
    calculating, using the dental parameters, at least four intraoral reference landmarks in a patient's jaw, dental arch, residual bone ridge, and cast model; and integrating the four intraoral reference landmarks into a system base of two-dimensional (2D), three-dimensional (3D), or four dimensional (4D) dental implant planning or design software or any other software.

16. The method claim 15 further comprising calculating locations and positions to place implants.

17. The method of claim 15 wherein the calculating of the at least four intraoral reference landmarks is performed in a microprocessor on the dental measurement device.

18. The method of claim 15 wherein the calculating of the at least four intraoral reference landmarks is performed in a smart phone connected to the dental measurement device through a Wi-Fi transceiver.

19. The method of claim 15 wherein the calculating of the at least four intraoral reference landmarks is performed in a computer connected to the dental measurement device through a Bluetooth transceiver.

20. The method of claim 15 wherein adjustment of the middle bar is effectuated through turning of a knob.

\* \* \* \* \*